2,792,260

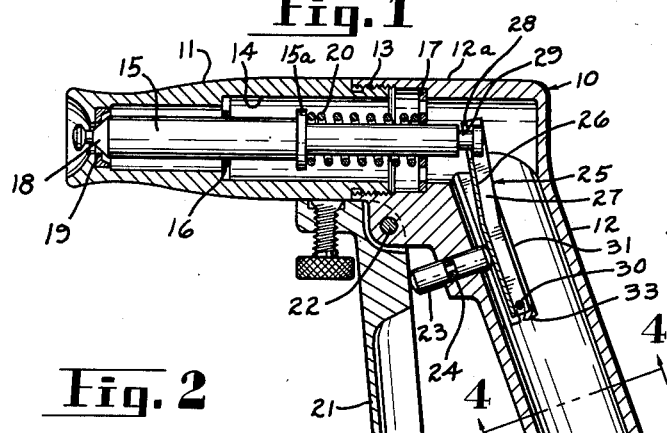
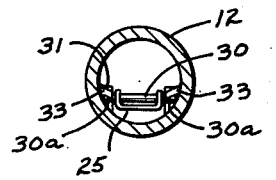
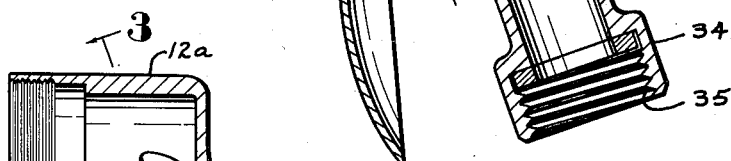
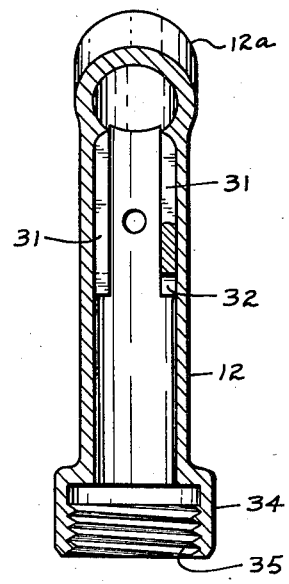
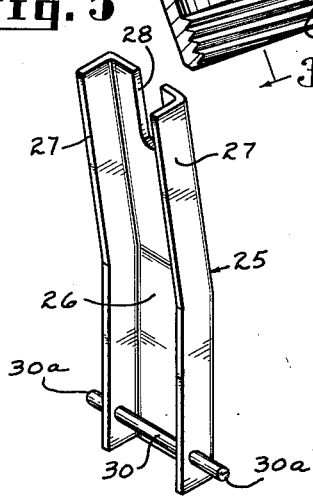
INVENTOR
Harry A. Wood
BY
*H. F. Johnston*
ATTORNEY United States Patent Office 2,792,260
Patented May 14, 1957

HOSE NOZZLE

Harry A. Wood, Denver, Colo., assignor to Scovill Manufacturing Company, Waterbury, Conn., a corporation of Connecticut Application December 12, 1956, Serial No. 627,905

2 Claims. (Cl. 299—112)

This invention relates to a pistol shaped nozzle adapted to be attached to the end of a hose, and in which the valve is closed by a spring and manually opened by a trigger-like operation.

In nozzles of this character, a lever is pivotally mounted on the inside of the nozzle body for operating the valve stem, which lever has to be actuated from the outside by a trigger. In the past it has been customary to mount such a lever by a hinge pin extending transversely through the nozzle body and assembled by driving said pin through a transverse bore in said body. This type of assembly has frequently resulted in a leaky connection at the point where the hinge pin is driven or assembled through the body wall. It is the principal object of my invention to improve the construction in such a manner that there will be no hinge-pin opening through the nozzle body.

Another object of this invention is to provide an arrangement wherein the parts can be economically manufactured and assembled and provide a nozzle that will be easy to handle and operate.

In the drawings:

Fig. 1 is a vertical section through a hose nozzle constructed in accordance with my invention.

Fig. 2 is a vertical section of the handle portion of the nozzle body, per se.

Fig. 3 is a sectional view of the handle portion taken along the line 3—3 of Fig. 2.

Fig. 4 is a transverse sectional view through the handle portion taken along the line 4—4 of Fig. 1, and Fig. 5 is a perspective view of the valve-stem-operating lever.

In the drawing the numeral 10 designates generally a nozzle body made up essentially of two parts, namely a nozzle section 11 in the form of a tubular barrel and a tubular handle section 12. The upper end of the tubular handle section 12 is formed with a hollow portion 12a that is screw threaded to the nozzle section as at 13 and forms a continuation of the nozzle section 11 and jointly defines a hollow chamber 14 within which a valve stem 15 is supported therein on bearings 16 and 17. The bearings 16 and 17 are suitably apertured to permit passage of fluid therethrough. It will be noted that the hollow portion 12a is constructed so as to dispose the handle section 12 in a biased position relative to the nozzle section when the parts are joined together for convenience in handling and manipulating the nozzle.

The outer end of the valve stem is formed with a valve head 18 that cooperates with a valve seat 19 in the discharge end of the nozzle section 11 to control the discharge of fluid from the nozzle. The stem 15 is normally urged to valve-closed position by a coil spring 20 surrounding said stem and compressed between the bearing 17 and a shoulder flange 15a integral with the intermediate section of said stem.

In order to operate the valve stem 15, a trigger member 21 is pivotally mounted substantially at the junction of the nozzle section 11 with the handle section 12 as by a pivot pin 22. The trigger member 21 substantially parallels the handle section and cooperates with a plunger pin 23 slidably mounted in a bore in said handle section. The plunger pin 23 may be sealed against leakage as by an O ring 24 of well known construction. The immediate end of the plunger pin 23 bears against a valve-stem-operating lever 25 located within the hollow of the handle section 12.

The novel manner in which the lever 25 is mounted within the nozzle tubular handle 12 will now be considered. In the form disclosed, the lever preferably is formed up from a sheet metal blank and consists of a base wall 26 strengthened by side flanges 27. The upper end of the lever 25 is provided with an open-end slot 28 to permit the lever 25 to be slipped upwardly into a circumferential groove 29 formed in the inner end of the valve stem 15 and disposed in line with the bore in said handle, thus establishing an operating connection therebetween. The opposite end of the lever 25 is provided with a transverse pin 30 secured to the side flanges 27 and extended oppositely therefrom as hinge pintles 30a.

In order to mount and hingedly connect the valve-stem-operating lever entirely within the hollow of the tubular handle 12, a pair of spaced longitudinal bosses or lugs 31 project inwardly from the front wall of the handle interior, and their lower ends are formed with downwardly opening recesses 32. In assembling the lever 25 into the handle 12, the hinge pintles 30a of said lever are adapted to be fitted up into the recesses 32, and the corner ends of said bosses 31 are adapted to be upset or swaged inwardly as at 33 for permanently confining said pintles within said recess.

The lower end of the tubular handle 12 is formed with an enlargement 34 with a threaded interior 35 for the purpose of connecting the nozzle on to the end of a hose.

It will be evident from the above construction that the valve-stem-operating lever can be assembled through the open end of the tubular handle 12, operatively joined to said stem and hingedly connected into place without any hinge pin extending through the casing wall of the nozzle such as might create a place for leakage.

I claim:

1. A pistol shaped nozzle having a tubular barrel formed with a valve seat at one end thereof and a tubular handle angularly depending from the opposite end thereof, a spring pressed valve stem mounted within said tubular barrel and normally engaging said valve seat, a trigger hinged substantially at the juncture of said tubular barrel and handle, a lever mounted within said handle, means connecting said trigger to said lever, means providing a slip assembly connection between the upper end of said lever and inner end of said valve stem, and means affording a hinging connection for the opposite end of said lever entirely within the tubular handle including a pair of spaced bosses projecting internally from the wall of the barrel and forming bearings for the lever.

2. A pistol shaped nozzle having a tubular barrel formed with a valve seat at one end, a tubular handle depending angularly from the opposite end thereof, a spring pressed valve stem mounted within said barrel normally urged toward said valve seat, said stem having a groove in line with the bore of said handle, a valve-stem-operating lever having a slotted upper end engaging in the groove of the valve stem, said lever having laterally projecting hinge pins at the bottom end, said handle having internal lugs with downwardly opening recesses whereby the lever can be put in place from the bottom open end of the handle with the pins entering the recess when the slotted end engages in the groove of the valve stem, said recesses being partially closed under said pins by deformation of one of the walls of each recess, an operating trigger hinged to the nozzle, and a plunger extending through a wall of the handle one end of which is engaged by the trigger and the other end of which engages the lever.

References Cited in the file of this patent

UNITED STATES PATENTS

| | | |
|---|---|---|
| 2,064,794 | Klauminzer | Dec. 15, 1936 |
| 2,584,943 | Thomas | Feb. 5, 1952 |
| 2,656,217 | Roche | Oct. 20, 1953 |